United States Patent [19]

Bohlander

[11] 4,067,652

[45] Jan. 10, 1978

[54] METHOD AND MEANS FOR THE DETERMINATION OF A PLANAR DIMENSION

[75] Inventor: Peter Bohlander, Dusseldorf, Germany

[73] Assignee: Institut fur Angewandte Forschung GmbH, Germany

[21] Appl. No.: 676,623

[22] Filed: Apr. 13, 1976

[30] Foreign Application Priority Data

Apr. 16, 1975 Germany .............................. 2516756

[51] Int. Cl.² ............................................. G01B 11/04
[52] U.S. Cl. .................................... 356/160; 250/560; 356/167
[58] Field of Search ............................... 356/157–160, 356/167, 199; 250/223 R, 224, 560, 202

[56] References Cited

U.S. PATENT DOCUMENTS

| | | | |
|---|---|---|---|
| 3,694,658 | 9/1972 | Waston et al. | 356/199 |
| 3,874,798 | 4/1975 | Antonsson et al. | 250/560 |

FOREIGN PATENT DOCUMENTS

2,200,324  7/1972  Germany .............................. 356/159

Primary Examiner—John K. Corbin
Assistant Examiner—Wm. H. Punter
Attorney, Agent, or Firm—Holman & Stern

[57] ABSTRACT

In measuring the width of rolled stock, a photo-sensitive diode array overlying an edge of the stock is scanned to provide an indication of the position of the edge of the stock, the outputs of the diodes appearing serially to provide a waveform. To find the step in this waveform which represents the edge, the waveform is filtered to replace falling edges by shallow slopes and rising edges are detected in a peak rectifier/capacitor arrangement which can only discharge slowly. An output comparator is triggered in each cycle (except the first) by any rising edge signal which causes charging of the peak storage capacitor. The output comparator signal indicates the position in the scanning cycle of the article edge.

21 Claims, 15 Drawing Figures

METHOD AND MEANS FOR THE DETERMINATION OF A PLANAR DIMENSION

This invention concerns a method of determining a planar dimension (i.e. one dimension of a given surface in one plane) for example the width of rolled stock, wherein the lateral edge of the surface to be measured is projected on photo-sensitive diodes which are scanned by means of an electronic counter device, the individual diode signals being evaluated as a measure of the planar dimension in as much as the number of steps which are counted from a starter pulse to a jump, break, or transition in photo-sensitive diode brightness is used to define the value of the dimension to be determined. The invention also concerns a device which is suitable for the execution of this method.

A method of this kind is already described in German OS No. 2 140 939. In this earlier process and arrangement the total width of a matrix formed by the photo-sensitive diodes is exposed to parallel light irradiation with the object to be measured positioned in front of said matrix. However, when these planimetric measurements are taken under normal production conditions, they are liable to be adversely affected by vapours and smoke which tend to falsify individual diode signals. For this reason the light value, or luminosity (brightness) of the photo-sensitive diodes must be adjusted in accordance with such interfering circumstances in order to have some indication as to whether or not a photo-sensitive diode is actually receiving light. This means that this conventional method is restricted to fairly strong brightness contrasts.

The present invention aims to develop the conventional method further with a view to allowing its satisfactory application, even under severely adverse interfering conditions, without having to adapt the brightness of the photo-sensitive diodes to the latter. According to this invention this aim is achieved by reason of the fact that the results or measurements obtained from individual successive photo-sensitive diodes are stored for the duration of a first scanning pass up to the next scanning pass and the differences are formed, the maximum difference measured in the course of said first pass being stored up to the next scanning pass, and if a higher, or a slightly lower difference value is obtained in the course of the subsequent scanning pass over the diode hand a trigger pulse will be released which terminates the counting steps of the electronic counter device.

In the course of the first scanning pass the positive brightness differences between immediately adjacent or successive diodes are ascertained. These brightness differences may then be stored in a peak-value store, or memory device operating with a slow discharge rate. The trigger pulse will then be released when said peak value store is being charged. It will be appreciated that the first scanning pass over a band or line of photo-sensitive diodes according to this method will not provide a positive measurement result because, first of all, it is necessary to execute a "learning pass" in order to ascertain the significant variation in the illumination state of a photo-sensitive diode with the aid of the values and findings in the peak-value store. It is assumed that the various interfering influences of steam, water vapour and the like will be perfectly harmless, provided it is ensured that these will not give rise to greater brightness differences being measured for successive photo-sensitive diodes than would correspond to the above mentioned significant difference value.

In as much as not only positive brightness differences but the absolute value of brightness difference are ascertained and stored, two trigger pulses will be obtained in any one diode band, provided the band is of adequate length, so that the counting steps of the electronic counter device may then be arranged to occur between said two trigger pulses with the result that they may be used for ascertaining the width of continuously advancing strip material. Whilst the earlier proposed method only requires the scanning, or ascertaining of the distance between one lateral edge of the material and a stationary reference stop, the present arrangement, using an otherwise identical form of diode band, affords a better resolution of the measured results. For this reason it is advisable in most cases of execution of the proposed method to align a separate diode-band scanning camera with associated light source of per se conventional type with each lateral edge defining the dimension to be ascertained or measured, in which event of said diode band cameras would be associated with its own stationary reference stop. Conveniently a conventional automatic scanner type of diode-band camera is selected for this purpose with a single output providing a serialtime signal of the state of illumination of all of the photo-sensitive diodes. The individual photo-sensitive diodes are successively charged to a constant potential by a shift register. The charges required for this purpose provide a measure for the preceding light exposure of the individual diodes since the charge decay by the photo-electric current occurs proportionally with the amount of light. The individual charging current pulses are electronically converted into exposure-proportional potential pulses. The light sensitivity of the diodes may be increased by using long integration periods, that is to say, long periods or intervals between successive charges.

Conveniently the potential or voltage pulses of the individual photo-sensitive diodes are passed through a filter circuit which allows only the passage of those potential variations which correspond to brightness differences in one direction and filters out the potential variations in the opposite direction. The storing of only positive brightness variations of differences between two successively adjacent diodes means a considerable reduction or trimming with regard to the gradient of the descending flanks.

Conveniently the differences between successive potential pulses are formed by means of a delay circuit consisting of low pass stages. In principle the said differentials may also be formed by means of an R.C. differentiation unit.

The maximum potential difference is stored by means of a peak rectifier circuit which is discharged by a current source adapted to be controlled in accordance with scanning frequency. The gradient or steepness of the rear flank is influenced in such a way as to keep the drop of potential during the exposure time of the photo-sensitive diode band constant throughout. The exposure time may be reduced in conventional manner by an increased radiation control circuit with the frequency of the shift rhythm being increased so that it is always possible to work with a constant amplitude of the significant signal for the reference brightness difference value.

In principle, the trigger pulses should be released when the peak rectifier is being charged. However, if the maximum difference in the potential of successive photo-sensitive diode pulses is too small to release a trigger pulse it is advisable to retain the result of the electronic counter from the preceding band scanning stage which did produce such a trigger pulse.

On the one hand, the positions, e.g. of strip edges, to be ascertained by counting the diodes up to the trigger pulses provide a direct digital signal for the width of the strip. Over and above this, however, they may also be converted into proportional potentials to present an analogue signal of strip width. If a separate diode scanner camera is provided for each of the two lateral strip edges, additional consideration must be given to a constant which corresponds to the distance of the camera. Alternatively a theoretical value may be substracted whereby it is possible to obtain a direct indication of any deviations in the width of the strip.

Naturally the provision of a light source behind the strip may be dispensed with in the case of measuring rolled stock which emits a sufficiently strong radiation by virtue of its high temperature.

In principle, owing to the resolving capacity of a diode scanner camera the diodes which are situated in the boundary region will not receive full light exposure and cannot, therefore, provide a reliable signal. According to a further feature of this invention this disadvantage is remedied by providing a time-variable functional potential instead of the time constant potential for the trigger threshold for distinguishing bright and dark diodes, which function is supplied by a function generator. Best results are obtained with a potential function formed from a direct current potential with superimposed triangular potential. In this way any possible fault caused by part-exposed photo-sensitive diodes is rapidly compensated in the statistic means.

In further illustration of this invention we refer to the accompanying drawings which represent by way of example, practical embodiments and wherein.

Figure 1:
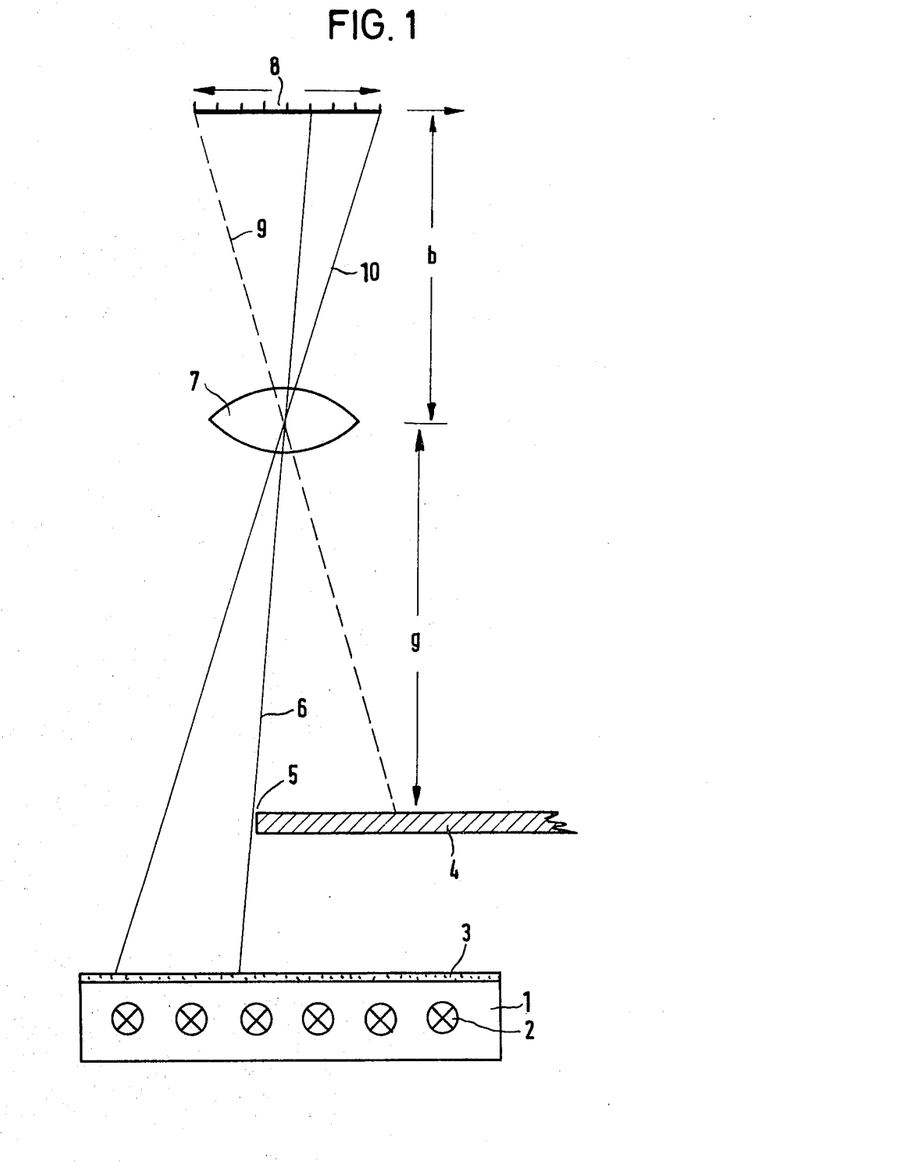
FIG. 1 shows the basic disposition of the diode-band camera for measuring the position of one edge.

In the lower part of FIG. 1 shows a row 1 of light sources 2 covered on one side by matt screen or focussing plates 3 to establish a large, uniform radiation density. The edge 5 of the rolled stock 4 whereof the width is to be measured extends in the path of radiation of the light so that alongside said edge 5 light radiation is possible only along the boundary line 6. This radiation passes through the objective lens 7 of a conventional diode-band scanner camera whereof the photo-sensitive diodes are arranged along the track, 8. The boundary rays 9 and 10 issuing from the diode band are aligned in such a way that on one side they will just impinge on the rolled stock 4 whereas on the other side they impringe on the matt screen plate 3. The measuring ray 6 whereby the image of the edge 5 is projected on the diode band 8 is situated between these two boundary rays 9 and 10. In the diagrammatic illustration the limiting light ray of 5 impinges on the fifth photo-sensitive diode, so that the diode band region between the fifth and the eighth photo-sensitive diodes in all is illuminated. The scale of representation corresponds to the relation between image length b and object length g (distance between image and lens, and distance between object and lens).

Figure 2:
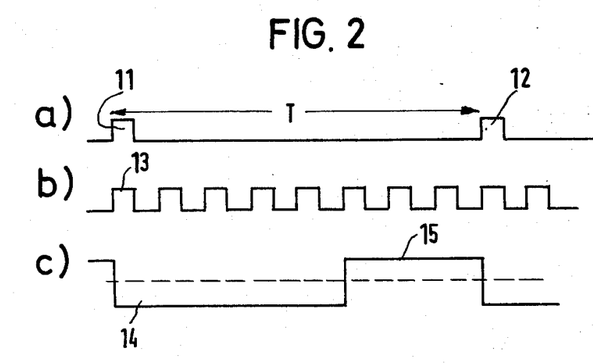
FIG. 2a shows the time succession of starter pulses.
FIG. 2b shows the time succession of rhythm pulses.
FIG. 2c shows the time succession of trigger pulses.

FIG. 2a illustrates two successive starter pulses 11 and 12 separated by the time interval T for scanning the diode band. The rhythm pulses which are produced by a shift register may be observed in FIG. 2b, wherein only the first has been marked at 13 for the sake of simplicity. FIG. 2c illustrates the trigger pulses. Corresponding to FIG. 1, the distance 14 is characterised by a signal corresponding to darkness representing the condition of the first five photosensitive diodes, whereas the following distance 15 shows a trigger signal corresponding to a state of illumination. This signal breaks off owing to the release of the next starter pulse 12 whereupon the scanning process commences afresh. The trigger threshold is indicated as a dotted line.

Figure 3:
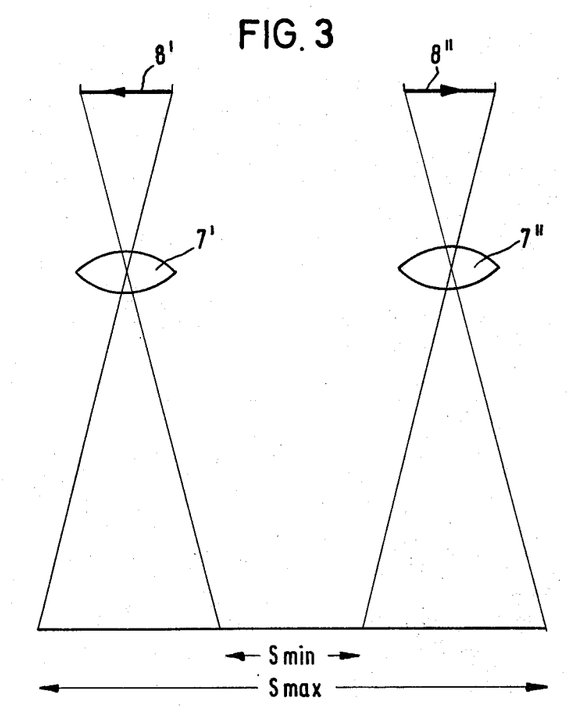
FIG. 3 illustrates the arrangement for measuring the width of rolled stock with the aid of two diode bands.

Altogether an image is formed in the diode band 8 which corresponds to a region defined by the focal width of the lens 7 of the diode scanner camera. For preference, in order to improve resolution capacity, as already mentioned, a separate diode scanner camera of this type is provided for each edge of the surface to be measured. Such an arrangement is depicted in principle in FIG. 3. This shows the two lenses 7' and 7" of the photo-sensitive diode scanner cameras which are associated respectively with the diode band 8' and 8". These bands, or lines are scanned in the direction of the arrows shown. The minimum width ascertained in this way is designated by Smin in the lower part of FIG. 3 whereas the maximum width is designated Smax.

Figure 4:
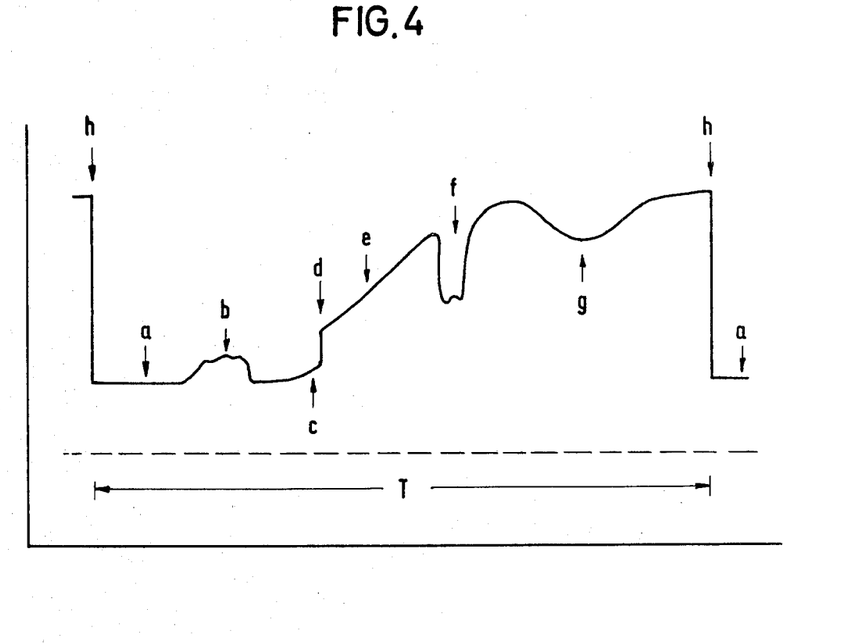
FIG. 4 shows irradiation intensity during scanning in the region of the edge of a rolled product which emits its own radiation.

Radiation intensity measured in the course of a line scanning pass over hot rolled strip which is hotter in its middle region than at the edges, may be represented in the form of a curve of the kind shown in FIG. 4. In this graph radiation intensity is plotted as the ordinate with time as the abscissa. The earlier mentioned scanning interval T between two starter pulses is clearly recognisable. A dotted line extends parallel with the abscissa and basically corresponds to darkness. This dotted line must not be confused with the similarly dotted trigger threshold line shown in FIG. 2c which serves merely to ascertain the signal released by the strip edges. Numerous practical examples have shown that after pulse release at a point h the following factors may be recorded in the resulting graph:

a. brightening up of fine water droplets and steam next to the strip caused by radiation from the strip,
b. increased radiation intensity due to water spray,
c. light diffusion in water and steam in the marginal region of the strip.
d. the actual edge of the strip is attained. The resulting "jump" or break in the graph is still small because the edge is colder than the middle of the strip,
e. increase of strip temperature from the edge towards the middle,
f. water on the strip, g. dark lines or stripes on the strip caused by irregularly spaced spray nozzles for cooling and de-scaling, h. end of image, start of new image.

The aim essentially resides in that point $d$ should be ascertained with adequate accuracy or certainty.

Figure 5:
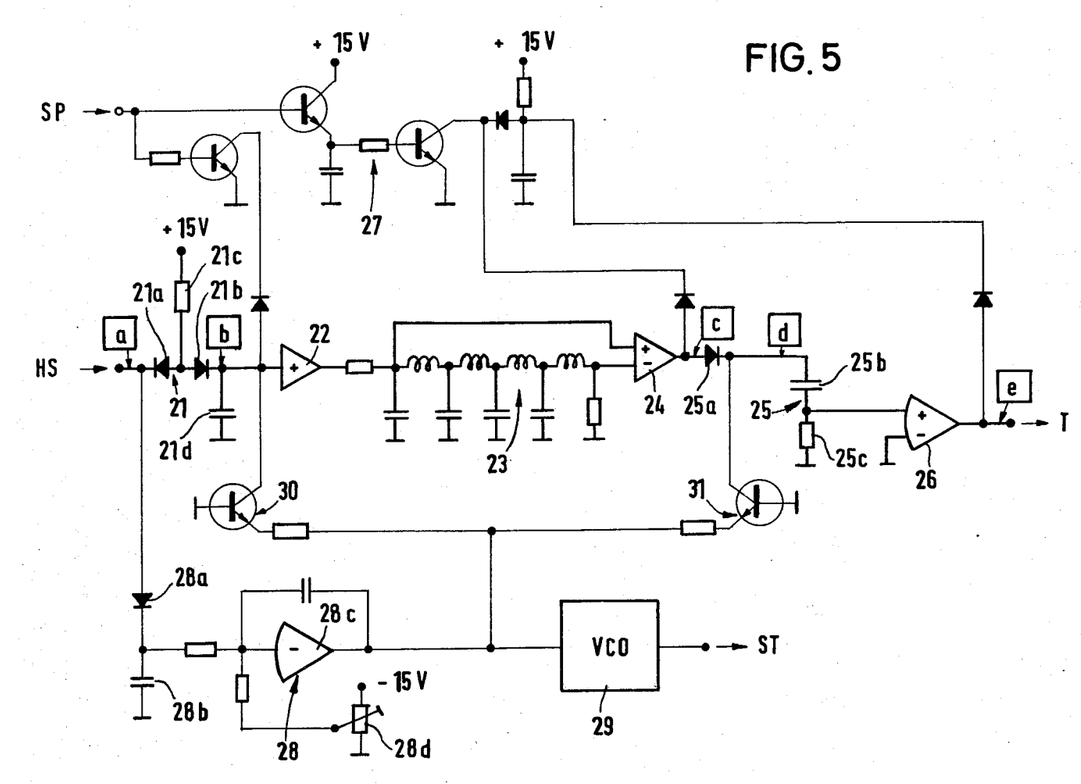
FIG. 5 is a simplified diagrammatic view of a trigger circuit.

In order to achieve this aim, the invention employs the trigger circuit which is diagrammatically represented in FIG. 5. In this trigger circuit the starter pulse SP at the start of the band or line of diodes is used as input and also the brightness signal HS of the diode band. Besides the shift rhythm ST for the diode band the trigger signal T is generated at the edge of the strip.

Figure 6:
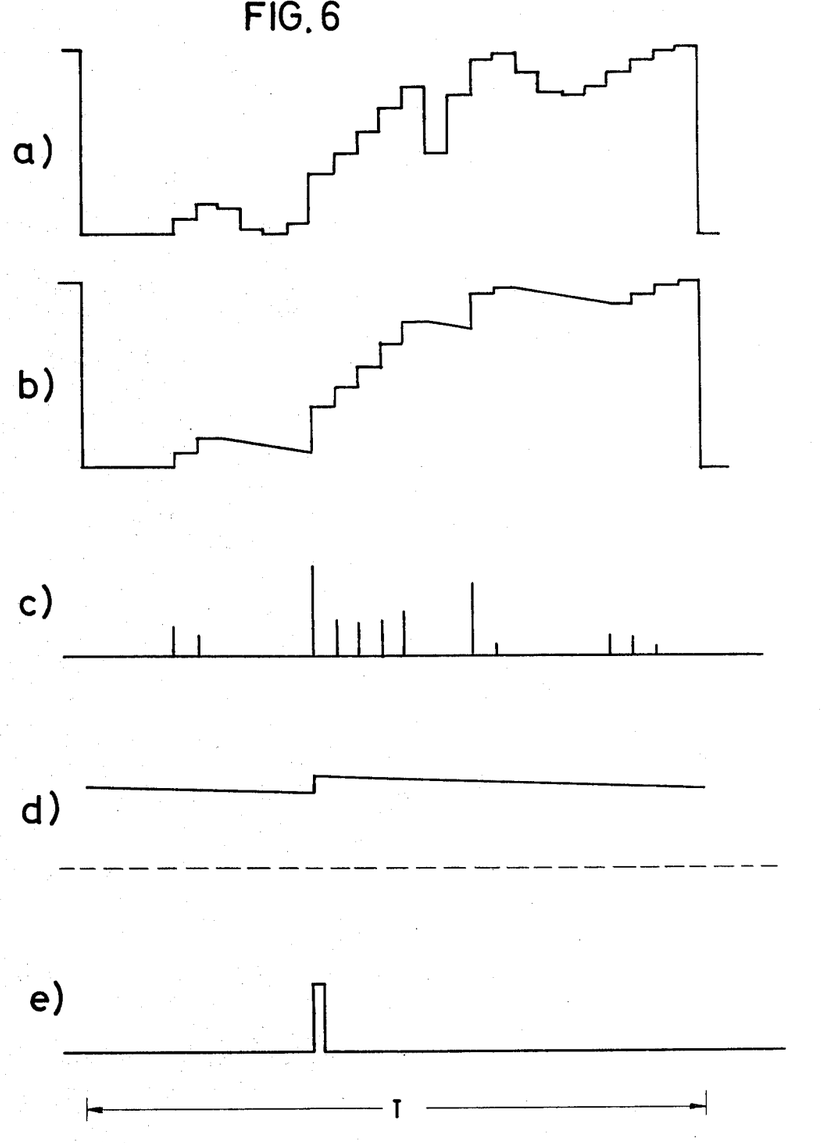
FIGS. 6a to 6e, are potential graphs taken at various points in the circuit of FIG. 5.

The individual elements of the circuit are shown in FIG. 5 whereas the potential curves represented in FIG. 6 are indicated by small letters in rectangular boxes. The circuit shown in FIG. 5 includes a filter circuit 21 for suppressing steep rear flanks of the brightness signals, said filter circuit comprising two diodes 21a and 21b, a resistor 21c and a capacitor 21d. This is followed, via a buffer amplifier 22, by a delay circuit 23 which comprises a plurality of low pass stages. The difference of successive brightness stages is formed by the differential amplifier 24 including the circuit components 22 and 23. Finally this figure shows the store circuit 25 for maximum potential difference value between two brightness stages, which circuit comprises a diode 25a, a capacitor 25b and a resistor 25c. The resistor will supply a potential only in the presence of a potential difference which is superior to the store potential previously fed into the store. In that event a comparator 26 releases a pulse as described. This is accomplished by the capacitor 25b charging through rectifier 25a and the comparator provides a triggering output pulse only in this circumstance. The gradual decay of store potential is controlled via current source 31 so that a value which has been fed into the store will disappear in course of time to be replaced by subsequent better values. A reset circuit 27 restores the filter 21 to its former condition at the start of an image. In view of the potentials $c$ and $e$ it is ensured that the reset circuit delays release to prevent false trigger pulses on release of potential $b$.

The amplitude of the brightness signal is adjusted by the circuit which comprises a peak-rectifier 28a, 28b, an operational amplifier integrator 28c and a potentiometer 28d for theoretical value. The output potential of the rheostat controls a variable frequency oscillator 29 which creates the shift rhythm pulses and also controls the output amplitude of the diode band via variations in exposure time T. A current source 30 which is controlled by the integrator potential keeps the slow voltage decay at point $b$ constant during the period T irrespective of the duration of the latter. The current source 31 which is also controlled by the potential likewise keeps the earlier mentioned slow decay of the store potential at point $d$ constant during perid T, irrespective of the length of said period.

In further explanation of the circuit according to FIG. 5, the potential curves at points $a$ to $e$ of this circuit are graphically shown in FIG. 6. Again time is plotted as abscissa and potential as ordinate. FIG. 6a corresponds to the radiation pattern shown continuously in FIG. 4 which is obtained by measuring the readings of the diode band. FIG. 6b shows the gradient restriction, or filtering of all descending flanks with the exception of the downward flank at the end of the diode band. As a result of this filtering operation and negative pulse flanks are virtually eliminated. FIG. 6c shows the assessment of positive brightness differences between immediately adjacent diodes whereas FIG. 6d represents the result of storing the brightness differences in the peak-value store 25. It will be seen that the store is slowly and gradually discharged in the manner described. FIG. 6e shows the resolution of a trigger pulse caused by charging of the peak-value store.

Figure 8:
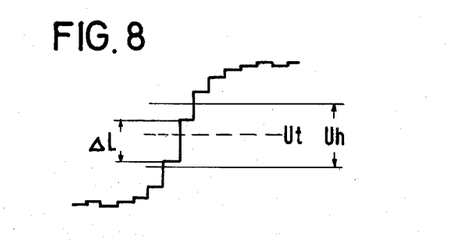
FIG. 8 is a perspective view illustrating improved resolution for a circuit according to FIG. 7.

In order to create an artifical variation of width for the object to be measured and for the means value in the manner described earlier on in this specification for the purpose of obtaining improved geometrical resolution of the strip edge image, the edge between bright and dark according to FIG. 8 is deliberately slightly blurred. The trigger potential Ut is superimposed by an auxiliary potential $\pm 0.5$ Uh, wherein Uh must be superior to the maximum signal potential "jump" $\Delta L$; the superimposed function must have a constant frequency distribution in the interval $\pm 0.5$ Uh, which is the case with a triangular, or saw-tooth voltage, and its frequency $f$ (Uh) must be small by comparison with the band frequency. The effect of Uh with regard to the width -measuring signal will be at its lowest if Uh is fed in opposite phase to the trigger circuits of the two diode scanner cameras.

Figure 7:
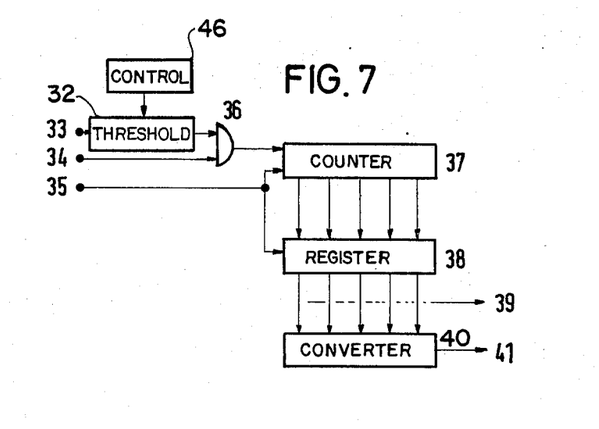
FIG. 7 is a block diagram of a variable trigger threshold circuit.

The block diagram for the variable trigger threshold, which cyclically varies the magnitude of the difference signal required to trigger the counter, is illustrated in FIG. 7. The individual characteristics of this diagram are as follows:

32: Trigger threshold,
33: Brightness signal,
34. Shift rhythm,
35. Starter pulse,
36: Gate,
37: Counter,
38: Register,
39. Digital output,
40: Digital-analogue converter (transformer),
41: Analogue output,
46: Trigger Threshold Control.

Figure 9:
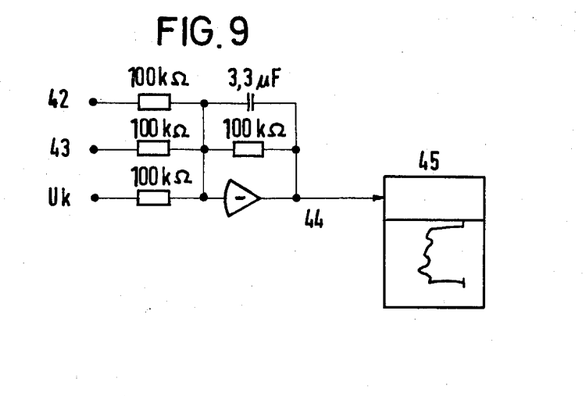
FIG. 9 is a block diagram for analogue calculation of width deviation from measurings of edge position in rolled strip.

With the aid of two diode scanner cameras and a reference or theoretical potential Uk it is possible to ascertain the width by means of the measured edge positions in accordance with the part-diagram of FIG. 9. The initial potential Uk corresponds to the theoretical or designed width so that the attached pencil or similar recording device may immediately provide a read out of the width deviation. In detail this block diagram presents the following elements:

42: Analogue output of first diode-scanner camera,
43: Analogue output of second diode scanner camera,
44: Width deviation, 45: Pencil or similar graphic recording device (print out).

The photo-sensitive camera hereinbefore referred to as conventional are specifically described in the publications: "Reticon", Model LC 600 digital line Scan Camera, made by Reticon Corp. 450 E Middlefield RD, Mountain View, California 94043, and "Solid State Linescan Cameras" by Integrated Photomatrix Ltd., The Grove Trading Estate, Dorchester, Dorset, England. Both these publications were published in 1974.

I claim:

1. Method of determining a planar dimension, for example determining the width of rolled stock, wherein an edge of the surface to be measured is projected on photo-sensitive diodes which are scanned by means of an electronic counter and whereof the individual diode signals are evaluated as a measure of the planar dimension by using the number of counting steps executed between a starter pulse and a brightness break or "jump" as a measure of the dimension to be determined, characterised in that the measuring results of successive individual photo-sensitive diodes are stored in the course of one scanning pass up to the next successive scanning pass and their differences are formed and in that the maximum difference value is stored up to the next scanning of the diode line in order to release a trigger impulse on achieving a greater, or a slightly lower difference value in the course of the following scanning pass of the diode line which trigger pulse terminates the counting steps of the electronic counter.

2. Method according to claim 1, characterised in that the potential pulses of the individual diodes are subjected to a filter circuit which allows only those potential breaks to pass through which correspond to brightness differences in one direction and in that potential variations or "jumps" in the opposite direction are filtered out.

3. Method according to claim 1, characterised in that the difference between successive pulses is formed by means of a delay circuit consisting of low pass stages.

4. Method according to claim 1, characterised in that the difference between successive potential pulses is formed by, or with the aid of, an R.C. differentiation unit.

5. Method according to claim 1, characterised in that in each case the maximum potential difference is stored by means of a peak-rectifier circuit which is discharged by a current source controlled in accordance with scanning frequency.

6. Method according to claim 1, characterized in that the trigger pulses are released as a result of the peak rectifier circuit being charged.

7. Method according to claim 1, characterised in that no trigger pulse is released for an inadequately strong maximum potential difference of the diode pulses and instead the counting result of the electronic counter from the previous line scanning pass is retained.

8. Method according to claim 1, characterised in that it is executed with the aid of a conventional automatically scanning photo-sensitive diode line scanner camera which delivers a single output of a serial time signal indicating the state of illumination of all the diodes.

9. Method according to claim 8, characterised in that a time variable potential function is pre-applied instead of a time constant potential for the trigger threshold to distinguish between bright and dark diodes, said function being formed by a function generator.

10. Method according to claim 9, characterised in that the potential function consists of a direct current potential superimposed by a triangular function.

11. Apparatus for use in determining a planar dimension of an article by detecting the position of an edge thereof, comprising the combination of an array of photo-sensitive semiconductor devices arranged to receive light adjacent said edge, scanning means for cyclically scanning said semiconductor devices, and a counter controlled by said scanning means and arranged to register in each operating cycle the number of signals from the semiconductor devices received between a start signal and a signal produced by the effect of the edge on the light received by the semiconductor devices, characterised by the provision of means for generating difference signals of magnitude determined by the change in the magnitude of the signals produced by successive semiconductor devices scanned and peak storage means for storing the peak difference signal in each cycle, so as to determine the value of the difference signal required in the next succeeding cycle to trigger said counter.

12. Apparatus as claimed in claim 11 including threshold varying means for cyclically varying the magnitude of the difference signal required trigger the counter.

13. Apparatus as claimed in claim 11 in which said difference signal generating means includes filter means for removing potential changes in one direction.

14. Apparatus as claimed in claim 13 in which said filter means comprises a rectifier and capacitor for storing peaks of the waveform from the photo-sensitive semiconductor devices, and a current source for discharging the capacitor at a constant rate.

15. Apparatus as claimed in claims 11 in which the peak storage means, includes a capacitor, a rectifier connecting one side of the capacitor to the output of the difference signal generating means and a current source connected to said one side of the capacitor for constantly discharging said capacitor.

16. Apparatus as claimed in claim 15 including a resistor in series with said capacitor and a comparator sensitive to the polarity of the voltage across said resistor, said comparator producing a triggering pulse only when the capacitor is being charged through the rectifier.

17. Apparatus as claimed in claim 11 in which there are two arrays of said semiconductor device associated respectively with opposite edges of the article.

18. Apparatus as claimed in claim 17 including means receiving signals from the two edge detecting circuits and from a reference source and producing an output corresponding to the deviation of the measured width from a desired width represented by said reference source.

19. Apparatus as claimed in claim 11, in which the difference signal generating means comprises a delay circuit.

20. Apparatus as claimed in claim 19 including a difference amplifier to which the signals at the input and the output of the delay circuit are applied.

21. Apparatus as claimed in claim 19 in which the delay circuit comprises a series of low pass stages.

* * * * *